US008855929B2

(12) United States Patent
Zhang et al.

(10) Patent No.: US 8,855,929 B2
(45) Date of Patent: Oct. 7, 2014

(54) USING OBJECT TO ALIGN AND CALIBRATE INERTIAL NAVIGATION SYSTEM

(75) Inventors: Gengsheng Zhang, Cupertino, CA (US);
Lionel J. Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 12/689,085

(22) Filed: Jan. 18, 2010

(65) Prior Publication Data

US 2011/0178708 A1    Jul. 21, 2011

(51) Int. Cl.
  *G01C 21/00* (2006.01)
  *G01C 21/16* (2006.01)
  *G01C 25/00* (2006.01)
  *G06T 7/00* (2006.01)

(52) U.S. Cl.
  CPC ............ *G01C 21/165* (2013.01); *G01C 25/005* (2013.01); *G06T 7/004* (2013.01); *G06T 2207/30244* (2013.01)
  USPC ........... 701/480; 701/494; 701/500; 701/501; 701/503; 701/523

(58) Field of Classification Search
  USPC ......... 701/480, 494, 500, 501, 503, 504, 505, 701/523
  See application file for complete search history.

(56) References Cited

U.S. PATENT DOCUMENTS

| | | | |
|---|---|---|---|
| 6,452,544 B1 | 9/2002 | Hakala et al. | |
| 6,542,824 B1 * | 4/2003 | Berstis | 701/472 |
| 6,556,722 B1 * | 4/2003 | Russell et al. | 382/291 |
| 6,594,600 B1 * | 7/2003 | Arnoul et al. | 702/94 |
| 6,859,729 B2 * | 2/2005 | Breakfield et al. | 701/2 |
| 7,487,042 B2 * | 2/2009 | Odamura | 701/420 |
| 7,606,664 B2 * | 10/2009 | Yokozawa | 701/434 |

(Continued)

FOREIGN PATENT DOCUMENTS

| | | |
|---|---|---|
| CN | 1272922 | 11/2000 |
| CN | 1286424 | 3/2001 |

(Continued)

OTHER PUBLICATIONS

Mirzaei et al., Oct. 2008, "A Kalman Filter-Based Algorithm for IMU-Camera Calibration: Observability Analysis and Performance Evaluation", IEEE Transactions on Robotics, vol. 24, No. 5.*

(Continued)

*Primary Examiner* — John R Olszewski
*Assistant Examiner* — Truc M Do
(74) *Attorney, Agent, or Firm* — Shyam K. Parekh; Michael Johnson (57) ABSTRACT

The initialization of an inertial navigation system is performed using information obtained from an image of an object. Positional and orientational information about the object in a global reference frame and positional and orientational information about the camera relative to the object are obtained from the image. Positional and orientational information for the camera in the global reference frame is determined along with a transformation matrix between inertial sensor reference frame and a navigation coordinate frame. The inertial navigation system is initialized using the positional and orientational information for the camera, the transformation matrix and the velocity of the camera when the object was imaged, i.e., zero. Using the initialized data with measurements from the inertial sensors the position of the mobile platform may be updated during navigation and provided, e.g., on a digital map. Inertial navigation errors may be corrected using information obtained from images of different objects.

25 Claims, 6 Drawing Sheets

(56) References Cited

U.S. PATENT DOCUMENTS

| | | | |
|---|---|---|---|
| 7,840,343 B2* | 11/2010 | Sakamoto | 701/457 |
| 7,845,560 B2* | 12/2010 | Emanuel et al. | 235/462.08 |
| 7,991,222 B2* | 8/2011 | Dimsdale et al. | 382/154 |
| 2002/0126364 A1 | 9/2002 | Miles | |
| 2003/0155413 A1 | 8/2003 | Kovesdi et al. | |
| 2004/0028258 A1 | 2/2004 | Naimark et al. | |
| 2004/0189517 A1 | 9/2004 | Pande et al. | |
| 2005/0008256 A1* | 1/2005 | Uchiyama et al. | 382/291 |
| 2005/0020309 A1 | 1/2005 | Moeglein et al. | |
| 2005/0026630 A1 | 2/2005 | Iso et al. | |
| 2005/0037775 A1 | 2/2005 | Moeglein et al. | |
| 2005/0143916 A1 | 6/2005 | Kim et al. | |
| 2005/0159154 A1 | 7/2005 | Goren | |
| 2005/0190972 A1* | 9/2005 | Thomas et al. | 382/218 |
| 2005/0253718 A1 | 11/2005 | Droms et al. | |
| 2006/0095349 A1 | 5/2006 | Morgan et al. | |
| 2006/0136129 A1 | 6/2006 | Yokozawa | |
| 2006/0184013 A1* | 8/2006 | Emanuel et al. | 600/426 |
| 2006/0229058 A1 | 10/2006 | Rosenberg | |
| 2007/0198180 A1* | 8/2007 | Sakamoto | 701/211 |
| 2007/0263924 A1* | 11/2007 | Kochi et al. | 382/154 |
| 2008/0069405 A1* | 3/2008 | Endo et al. | 382/106 |
| 2008/0082258 A1 | 4/2008 | Pham et al. | |
| 2008/0095402 A1* | 4/2008 | Kochi et al. | 382/103 |
| 2008/0096527 A1 | 4/2008 | Lamba et al. | |
| 2008/0109302 A1 | 5/2008 | Salokannel et al. | |
| 2008/0137912 A1* | 6/2008 | Kim et al. | 382/106 |
| 2008/0153516 A1 | 6/2008 | Hsieh | |
| 2008/0214149 A1 | 9/2008 | Ramer et al. | |
| 2009/0005975 A1 | 1/2009 | Forstall et al. | |
| 2009/0048779 A1* | 2/2009 | Zeng et al. | 701/214 |
| 2009/0093959 A1* | 4/2009 | Scherzinger et al. | 701/215 |
| 2009/0098873 A1 | 4/2009 | Gogic | |
| 2009/0115656 A1* | 5/2009 | Raman et al. | 342/357.03 |
| 2009/0248304 A1* | 10/2009 | Roumeliotis et al. | 701/220 |
| 2009/0254276 A1 | 10/2009 | Faulkner et al. | |
| 2009/0262974 A1* | 10/2009 | Lithopoulos | 382/100 |
| 2010/0017115 A1* | 1/2010 | Gautama | 701/202 |
| 2010/0329513 A1* | 12/2010 | Klefenz | 382/104 |
| 2011/0021207 A1 | 1/2011 | Morgan et al. | |
| 2011/0039573 A1 | 2/2011 | Hardie | |
| 2011/0143779 A1 | 6/2011 | Rowe et al. | |
| 2011/0306323 A1 | 12/2011 | Do et al. | |

FOREIGN PATENT DOCUMENTS

| | | |
|---|---|---|
| CN | 1637769 A | 7/2005 |
| CN | 101046378 A | 10/2007 |
| CN | 101144722 A | 3/2008 |
| EP | 1555541 A2 | 7/2005 |
| EP | 1790993 A2 | 5/2007 |
| GB | 2441644 A | 3/2008 |
| JP | H07231473 A | 8/1995 |
| JP | 10213644 | 8/1998 |
| JP | H11304489 A | 11/1999 |
| JP | 2000046856 A | 2/2000 |
| JP | 2004213191 A | 7/2004 |
| JP | 2005189225 A | 7/2005 |
| JP | 2005257738 A | 9/2005 |
| JP | 2005530365 A | 10/2005 |
| JP | 2006170872 A | 6/2006 |
| JP | 2006184235 A | 7/2006 |
| JP | 2007525094 T | 8/2007 |
| JP | 2008111828 A | 5/2008 |
| JP | 2011501523 | 1/2011 |
| JP | 2011525234 A | 9/2011 |
| TW | 593981 B | 6/2004 |
| WO | 2005004528 A1 | 1/2005 |
| WO | WO2005124594 A1 | 12/2005 |
| WO | WO-2008025013 | 2/2008 |
| WO | WO2008093103 A2 | 8/2008 |
| WO | WO2009098319 A2 | 8/2009 |

OTHER PUBLICATIONS

Alberto et al., "Inertial Navigation Systems for User-Centric Indoor Applications", Oct. 2010, XP002663219, Retrieved from the Internet: URL:http://geoweb.crs4.it/lib/exe/fetch.php"id=indoornavigation&cache=cache&media=ne[retrieved on Nov. 10, 2011]the whole document.

International Search Report and Written Opinion—PCT/US2011/021577—ISAEPO—Nov. 23, 2011.

Taiwan Search Report—TW100101862—TIPO—Jun. 10, 2013.

\* cited by examiner

USING OBJECT TO ALIGN AND CALIBRATE INERTIAL NAVIGATION SYSTEM

BACKGROUND

Accurate position information for mobile stations, such as cellular or other wireless communication devices, is becoming prevalent in the communications industry. The Global Positioning System (GPS) offers an approach to providing wireless mobile station position determination. A GPS user can derive precise navigation information including three-dimensional position, velocity and time through information gained from satellite vehicles (SVs) in orbit around the earth. The signals that are received from the SVs are typically rather weak. Therefore, in order to determine the position of the receiver, the receiver must be sufficiently sensitive to acquire these weak signals and interpret the information that is represented by them.

One limitation of current GPS receivers is that their operation is limited to situations in which multiple satellites are clearly in view, without obstructions, and where a good quality antenna is properly positioned to receive such signals. As such, they normally are unusable in areas with blockage conditions, such as where there is significant foliage or building blockage (e.g., urban canyons) and, particularly, within buildings.

SUMMARY

An inertial navigation system (INS) on a mobile platform continuously calculates the position, orientation, and velocity of the mobile platform by integrating measurements of accelerometers and gyroscopes. Before an INS can be used to calculate the position, orientation, and velocity, its position, orientation, and velocity must be initialized. The INS initialization is performed using information obtained from an image of an object. Positional and orientational information about the object relative to a global reference frame or a local coordinate system, and positional and orientational information about the camera relative to the object are obtained from the image of the object. Positional and orientational information for the camera in the global reference frame can then be determined The transformation matrix or the direction cosine matrix between inertial sensor reference frame and the global reference frame can then be determined from the camera position and orientation in the global reference frame and the known relative orientation between the inertial sensors and the camera. The transformation matrix between inertial sensor reference frame and the navigation coordinate frame can then be determined from the transformation matrix between inertial sensor reference frame and the global reference frame, and the transformation matrix between the global reference frame and the navigation coordinate frame. The orientation of inertial sensors can then be calculated from the transformation matrix between inertial sensor reference frame and the navigation coordinate frame. The inertial navigation system is initialized using the positional information for the camera in the global reference frame, the transformation matrix between the inertial sensor reference frame and the navigation coordinate frame, and the velocity of the camera when the object was imaged, i.e., zero. Using the initialized data along with measurements from the inertial sensors the position of the mobile platform may be updated during navigation and provided, e.g., on a digital map. Inertial navigation errors and inertial sensor errors may be estimated and corrected using information obtained from images of different objects.

DETAILED DESCRIPTION

A system and method described herein uses an image of an object to determine positional and orientational information that can then be used for initializing and calibrating inertial navigation system. The system may include a mobile platform that is capable of imaging an object, such as a data code label, and using the image of the object to determine positional and orientational information. The positional and orientational information can then be used by the mobile platform for initializing the position and orientation of the inertial navigation system. The position and orientation of the inertial navigation system can periodically be corrected by imaging different objects and similarly determining the positional and orientational information.

Figure 1:
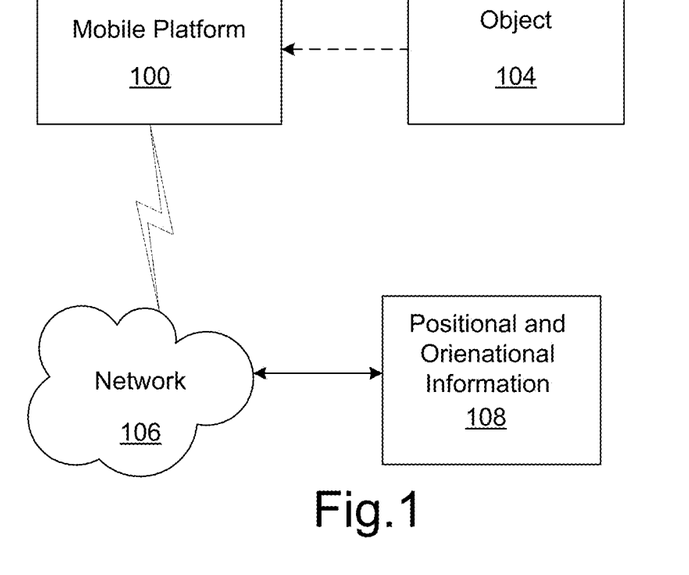
FIG. 1 illustrates a block diagram of a system including a mobile platform that performs inertial navigation system initialization and calibration using information obtained from an image of an object.

FIG. 1 illustrates a block diagram of a system including a mobile platform 100 that images an object 104 from which positional and orientational information about the object 104 may be acquired. The positional and orientational information about the object 104 may then be used to derive position and orientation information about the mobile platform 100, which can then be used for navigation. The positional and orientational information for the object 104 may be with respect to a coordinate system, such as a local coordinate system or a generalized global coordinate system, such as the WGS84 coordinate system used with GPS, both of which will be generally referred to herein as a global reference frame. The acquired information from the image of the object may also include, e.g., navigation instructions, a map of the local environment, or any other desired information.

Figure 2:
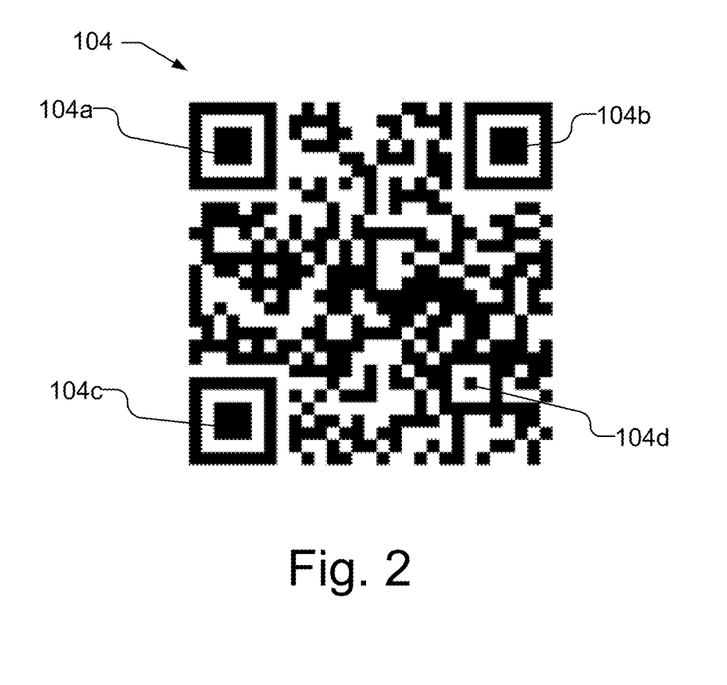
FIG. 2 is an example of an object in the form of a data code label, such as a Quick Response code.

The object 104 shown in FIG. 1 may be a physical tag that is attached to a location that is accessible to the mobile platform 100, such as at an entrance or directory sign to a building, or other accessible location. The object 104 may be a data code label such as a Quick Response (QR) code, which is a matrix code created by Japanese corporation Denso-Wave. Other types of objects or data code labels may be used, such a bar codes or machine readable representations of data, including one dimensional bar codes or optical data matrix style codes, such as Data Matrix code, Semacode, Maxicode, Aztec Code may be used if desired. The object 104 may be encoded with a hyperlink with, e.g., a Uniform Resource Identifier (URI), which can be used by the mobile platform 100 to access the positional and orientational information 108 stored on a server and accessed through network 106, such as the Internet. FIG. 2, by way of example, is an example of an object 104 in the QR code format that is encoded with the URI "http://www.example.com". If the object 104 is capable of encoding information in a sufficiently dense manner, e.g., using colorized QR codes, the object 104 may be used to pass the positional and orientational information directly to the mobile platform 100 without the use of a hyperlink.

As used herein, a mobile platform refers to a device such as a cellular or other wireless communication device, personal communication system (PCS) device, personal navigation device, Personal Information Manager (PIM), Personal Digital Assistant (PDA), laptop or other suitable mobile device that is capable of capturing images and navigating using internal sensors, including, but not limited to accelerometers, magnetometers, gyroscopes, and pressure sensors. Where the object 104 is encoded with a URI or otherwise requires access to a wireless network, the mobile platform 100 should be capable of sending and receiving wireless communications. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile platform."

The mobile platform 100 may be implemented in conjunction with various wireless communication networks, including cellular towers and from wireless communication access points, such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x or some other type of network. The techniques may also be implemented in conjunction with any combination of WWAN, WLAN and/or WPAN.

The mobile platform 100 may also be capable of position determination using a satellite positioning system (SPS), which may include any combination of one or more global and/or regional navigation satellite systems and/or augmentation systems, and SPS signals may include SPS, SPS-like, and/or other signals associated with such one or more SPS. For example, mobile platform 100 may be capable of position determination using Global Navigation Satellite System (GNSS) such as Global Positioning System (GPS), Galileo, Glonass or Compass, or various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems.

Acquiring positional and orientational information for a mobile platform using an object, such as a data code label, as described herein may be advantageous if the mobile platform does not have SPS capabilities or if the SPS system is inactive or in locations where SPS may not work adequately, e.g., in locations that suffer from blockage conditions. Blockage conditions may exist where the SPS receiver in the mobile platform has difficulty acquiring and/or tracking SPS signals from SPS satellites. For example, blockage conditions may exist in indoor environments, in urban canyon environments, and certain outdoor environments with natural obstacles, such as foliage and interfering topology.

Navigation without SPS or in blockage conditions presents two related problems: keeping an accurate sense of position and having access to local information about the topology. Navigation without the benefits of SPS is hampered by the relative difficulty of substituting other technologies. For example, almanacs of wireless access points can supply some data, but they would be expensive to compile and the source of almanac data appropriate for a local area may not be obvious to the user of a mobile platform. Another example is inertial sensors, which may provide information based on the tracking of movement through dead reckoning, but navigation via inertial sensors tends to amass errors over time. These techniques can benefit from access to information which associates location information with a specific position as well as from access to information which associates a position with related almanac data or available maps.

Figure 3:
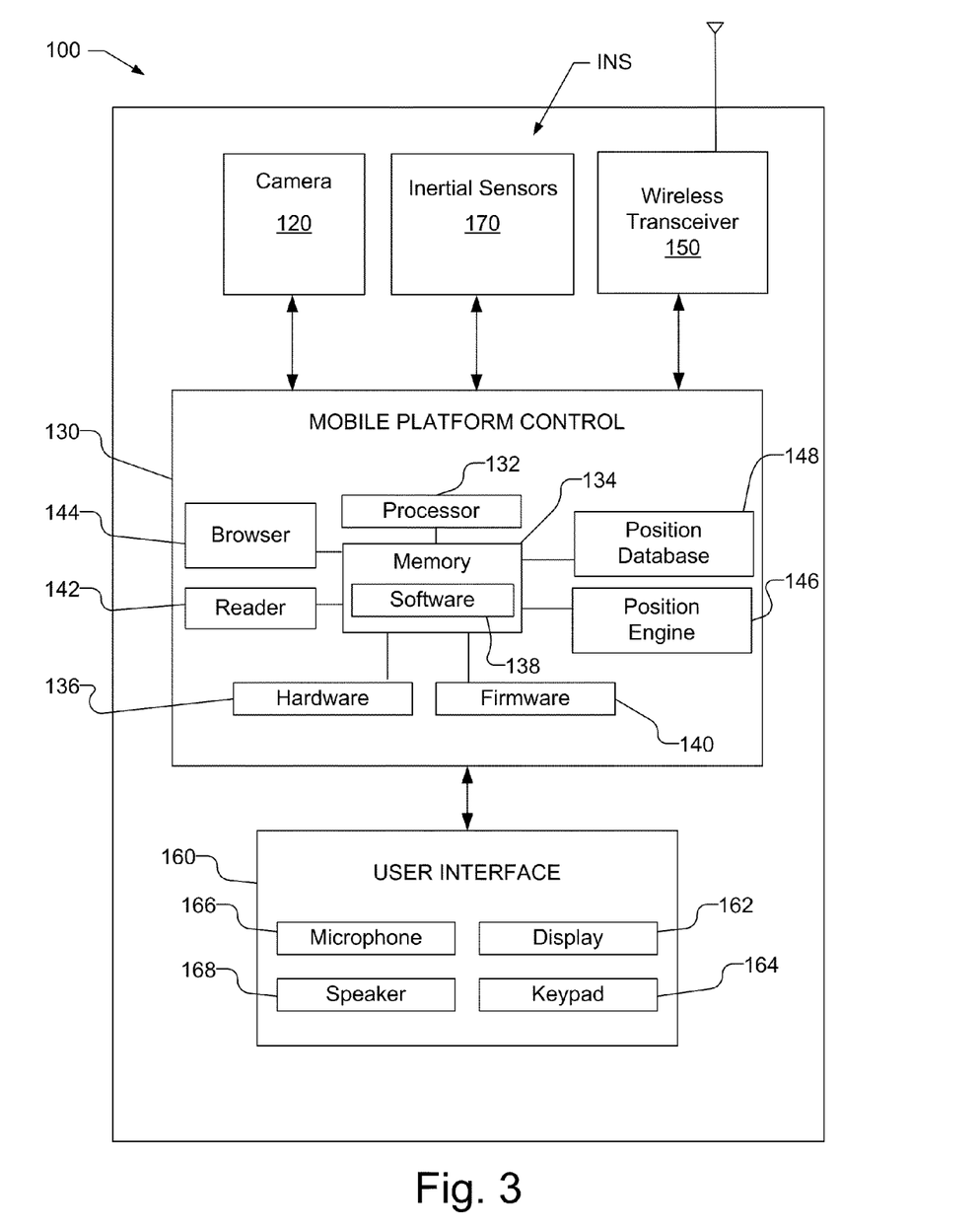
FIG. 3 is a block diagram of a mobile platform capable of navigation using information obtained from an image of an object.

FIG. 3 is a block diagram of a mobile platform 100 capable of navigation using information obtained from an image of an object 104 (FIG. 1). As illustrated, mobile platform 100 includes means for imaging the object 104, such as a camera 120. The camera 120 may be a conventional camera such as that typically found, e.g., in cellular telephones or the like. The camera 120 is calibrated so that the camera parameters, e.g., focal length, displacement of the optic center, radial distortion, and tangential distortion, are known. The camera 120 communicates with a mobile platform control 130 unit. The mobile platform control 130 is provided by a processor 132 and associated memory 134, hardware 136, software 138, and firmware 140. It will be understood as used herein that the processor can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The image of the object 104 produced by the camera 120 may be stored in memory 134 and the mobile platform 100 includes a means to read and decode information encoded in the object 104. For example, the mobile platform control 130 may include a reader 142, which may be suitable data code label reading software stored in memory 134, or a dedicated reader, e.g., of hardware or firmware, that extracts the encoded data from the object 104 and provides the extracted data to the mobile platform control 130.

The mobile platform 100 includes a means to obtain information related to the position and orientation of the object with respect to a global reference frame. By way of example, if the object 104 is dense enough to encode this information, the mobile platform 100 may use the reader 142 to obtain this positional and orientational information directly from the image of the object 104. However, where the positional and orientational information is not encoded in the object itself, the mobile platform 100 will have to obtain this information from another source. Thus, for example, the encoded data that is extracted from the object 104, may direct the mobile platform control 130 to access the network 106 (FIG. 1) and, specifically, a server containing the linked positional and orientational information 108, e.g., the position and orientation of the object 104, as well as other desired information, such as a digital local map. The mobile platform 100 may access the network 106, e.g., through a wireless network radio transceiver 150 that is capable of connecting to a network through a wireless access point. The transceiver 150 may connect to a wireless network such as Wireless Wide Area Networks (WWAN), Wireless Local Area Network (WLAN) or any other suitable protocol.

By way of example, if the data encoded in the object 104 includes the keyword http://, the mobile platform control 130 may launch a browser 144 on the mobile platform 100 and direct the browser to the encoded URI. The mobile platform controller 130 may then download the positional and orientational information 108 including the positional and orientational information for the object 104 with respect to a global reference frame. Additional information may also be downloaded, such as a digital map of the local environment to be displayed by the mobile platform 100 on a visual display 162 in the user interface 160 of the mobile platform 100. The user interface 160 may also include features such as a keypad 164, microphone 166 and speaker 168 when the mobile platform 100 is a cellular telephone.

The mobile platform 100 also includes an inertial navigation system (INS), including a means for sensing movement, e.g., changes in the position or orientation of the mobile platform 100. For example, inertial sensors 170 may be used to provide data to the mobile platform control 130 with respect to direction and magnitude of movement of the mobile platform 100. Examples of inertial sensors 170 that may be used with the mobile platform 100 include accelerometers, magnetometers, gyroscopes, and pressure sensors. The orientation of the inertial sensors 170 with respect to the camera 120 is fixed and is determined through calibration. In other words, a transformation matrix between a reference frame for the camera 120 and a reference frame for the inertial sensors 170 is known.

The mobile platform 100 may also include a position database 148 that is used to store and update the position and orientation of the mobile platform 100. As the mobile platform control 130 determines that the position and/or orientation of the mobile platform 100 changes via inertial sensors 170, the position database 148 is updated with the new positional and orientational information. The updated positional and orientational information can then be provided, e.g., by displaying the digital map with the new position on the display 162 or by providing additional navigation instructions on the display and/or via speaker 168.

The mobile platform 100 also includes a means for estimating a position and orientation of the camera 120 relative to the object 104 based on the image of the object 104 produced by the camera 120. For example, the mobile platform 100 may include a position engine 146 which may be suitable software stored in memory 134 or dedicated hardware or firmware. The position engine 146 determines the position of the camera 120 based on the two dimensional image of the object 104 using the known camera parameters, such as focal length, and known feature points in the image, which may have a standard configuration and are therefore known, or which may be downloaded along with the positional and orientational information 108. For example, referring to the image of an object 104 in FIG. 2, the feature points 104a, 104b, 104c, and 104d may be identified by position engine 146 and used to determine the position and orientation of the camera relative to the object 104, while the information between the feature points 104a, 104b, 104c, and 104d may be the encoded data. Based on four or more feature points in the image of the object 104, the position engine 146 can estimate the position and orientation of the camera relative to the object, e.g., using homography transformation. Homography is a projective mapping of a planar object's points to the image of a camera.

The mobile platform 100 further includes a means for determining a position and orientation of the camera 120 in the global reference frame using the estimated position and orientation of the camera 120 relative to the object 104 and the obtained positional and orientational information for the object 104. The position and orientation of the camera 120 with respect to a global reference frame can be determined by, e.g., the position engine 146. The mobile platform may also include a means for determining the orientation of the inertial sensors 170 with respect to a navigation coordinate frame, which may be, e.g., the position engine 146. Using the determined position and orientation of the camera 120 in the global reference frame, the determined orientation of the inertial sensors 170 with respect to the navigation coordinate frame, and the velocity of the camera 120 at the time of imaging the object 104, which may be presumed to be zero, the INS may be initialized. The initialized data can then be used along with measurements from the inertial sensors 170 to update the position of the mobile platform 100. Additionally, as will be discussed, additional objects may be imaged and analyzed in a similar fashion to correct errors in the inertial navigation of the mobile platform 100.

The methodologies described herein may be implemented by various means depending upon the application. For example, these methodologies may be implemented in hardware 136, software 138, firmware 140, or any combination thereof For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof For a firmware and/or software implementation, the methodologies may be implemented with modules (e.g., procedures, functions, and so on) that perform the functions described herein. Any machine-readable medium tangibly embodying instructions may be used in implementing the methodologies described herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 138 codes may be stored in memory 134 and executed by the processor 132 and may be used to run the processor and to control the operation of the mobile platform 100 as described herein. For example, a program code stored in a computer-readable medium, such as memory 134, may include program code to decode an object that is imaged by the camera 120, obtain positional and orientational information about the object, estimate a position the camera relative to the object, determine the camera position and orientation with respect to the global reference frame, and determine the orientation of the inertial sensors with respect to a navigation coordinate frame. The program code stored in a computer-readable medium may further include program code to use the determined camera position and orientation, along with measurements from the inertial sensors to update the positional and orientational information of the mobile platform and to provide the updated positional and orientational information.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
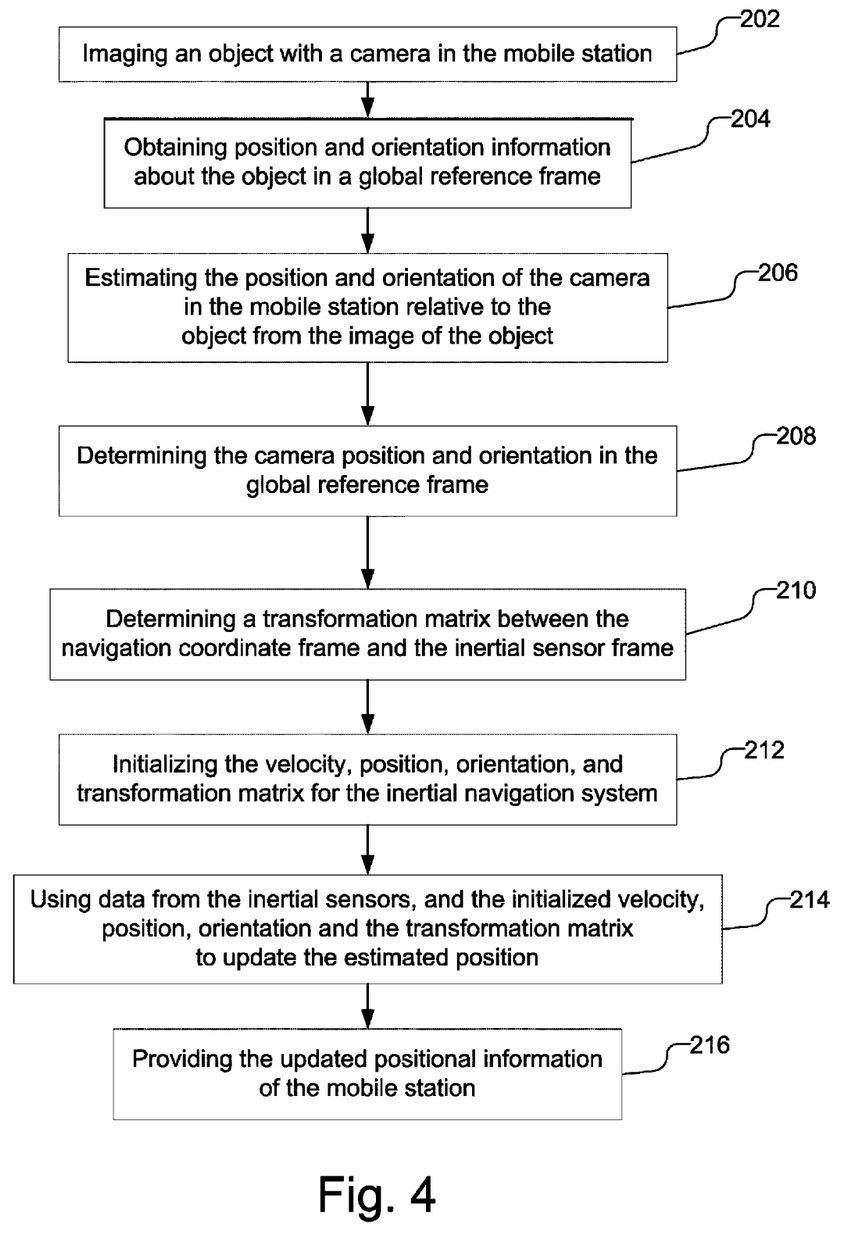
FIG. 4 is a flow chart showing a method of using information obtained from an image of an object for inertial navigation.

FIG. 4 is a flow chart showing a method of using the image of an object 104 in inertial navigation. As illustrated, an object 104, such as a data code label, is imaged (202) by the mobile platform 100. By way of example, the camera 120 in the mobile platform 100 may capture an image of an object 104 that is located at the entrance or directory sign of a building, such as a hospital, museums, shopping centers, etc. The mobile platform control 130 processes the image to decode the object 104. Using the decoded data from the image of the object 104, positional and orientational information, including the position and orientation of the object 104 with respect to a global reference frame may be obtained (204). For example, a URI encoded in the object 104 may be used to access and download the positional and orientational information via a wireless network. The positional and orientational information may also include additional information, such as a digital map of the local environment. Alternatively, the decoded data may include the positional and orientational information for the object 104, e.g., if the object 104 may be encoded in a sufficiently dense manner.

Figure 5:
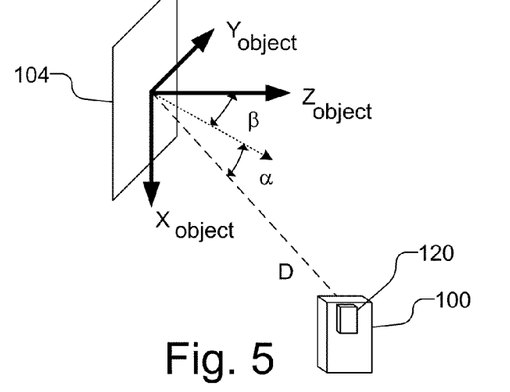
FIG. 5 illustrates a perspective view of a camera in a mobile platform relative to an object.

The position and orientation of the camera 120 is estimated relative to the object 104 using the image of the object 104 (206). FIG. 5, by way of example, illustrates a perspective view of a mobile platform 100 with a camera 120 relative to an object 104. Using the image of the object 104, known camera parameters, such as focal length, and known feature points on the object 104, the position and orientation of the camera 120 with respect to the object 104 can be determined For example, referring to the image of an object 104 in FIG. 2, the feature points 104a, 104b, 104c, and 104d may be identified from the image and used to determine the position and orientation of the camera relative to the object 104 using homography transformation. Homography is a projective mapping of a planar object's points to the image of a camera. The distance between the feature points 104a, 104b, 104c and 104d, as well as their orientation may be obtained using the data encoded in the object 104, e.g., either by accessing the wireless network or the information may be encoded in the object. Alternatively, a standardized configuration for the feature points in the object may be used. With the known camera parameters and feature points on the object 104, the relative distance D from the center of the object 104, as well as the azimuth angle $\beta$ from the normal vector $Z_{object}$ in the plane defined by $Z_{object}$ and $Y_{object}$, as well as the elevation angle $\alpha$ are determined, as illustrated in FIG. 5.

Figure 6:
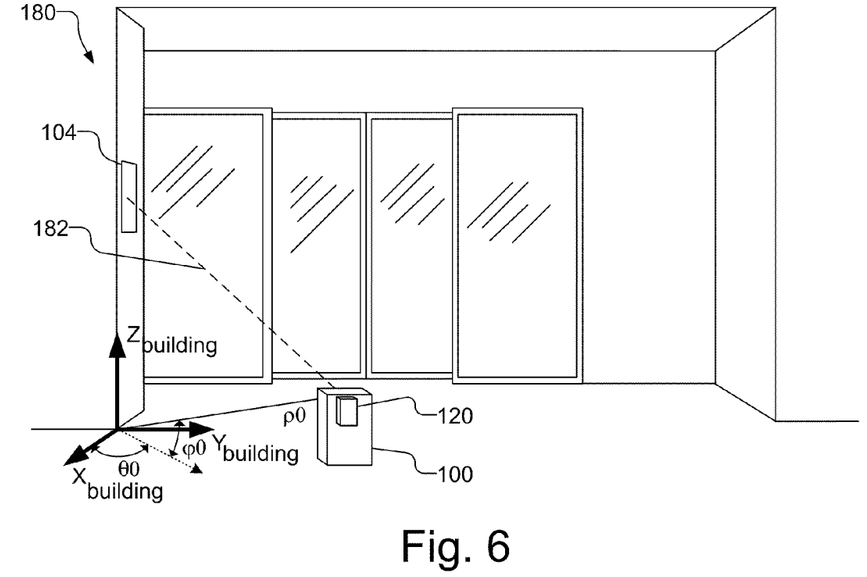
FIG. 6 illustrates a perspective view of a camera in a mobile platform relative to an object that is located at the entrance of a building.

Using the estimated position and orientation of the camera 120 with respect to the object 104, and the obtained position and orientation of the object 104 with respect to a global reference frame, the camera position and orientation with respect to the global reference frame is determined (208). FIG. 6, by way of example, illustrates a perspective view of a camera 120 in a mobile platform 100 relative to an object 104 that is located at the entrance of a building 180. The global reference frame is illustrated as the building reference frame $X_{building}$, $(Y_{building}, Z_{building}$, but any desired reference frame, including local or global coordinates, may be used. As illustrated by the dotted line 182 in FIG. 6, the position and orientation of the camera 120 with respect to the object 104 is determined as discussed in step 206 above. Based on the obtained position and orientation of the object 104 in the global reference frame, and the determined position and orientation of the camera 120 with respect to the object 104, the position and orientation of the camera 120 can be determined with respect to the global reference frame, $X_{building}$, $Y_{building}$, $Z_{building}$ in terms of the distance $\rho_0$, the azimuth angel $\theta_0$ and the elevation angle $\phi_0$. In other words, the transformation matrix between the camera reference frame and the global reference frame based on the image of the object 104 is determined as follows:

$$C_{camera}^{global\text{-}ref} = C_{object}^{global\text{-}ref} C_{camera}^{object} \qquad \text{Eq. 1}$$

where $C_{camera}^{global\text{-}ref}$ is the transformation matrix between the camera reference frame and the global reference frame, $C_{object}^{global\text{-}ref}$ is the transformation matrix between the reference frame for the object 104 and the global reference frame, which can be calculated from the obtained orientation of the object 104 with respect to a global reference frame, and $C_{camera}^{object}$ is the transformation matrix between the camera reference frame and the reference frame for the object, which can be calculated from the orientation of the camera 120 with respect to the object 104 determined in step 206 above. The camera orientation with respect to the global reference frame can be calculated from $C_{camera}^{global\text{-}ref}$.

Figure 7:
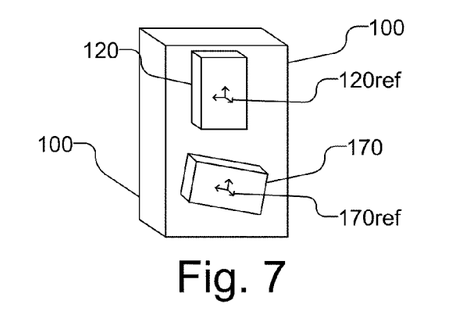
FIG. 7 illustrates a perspective view of the camera in the mobile platform along with inertial sensors.

Using the determined position and orientation of the camera 120 with respect to the global reference frame and the known orientation between the camera 120 and the inertial sensors 170, a transformation matrix between the navigation coordinate frame for the mobile platform 100 and the inertial sensor reference frame is determined (210). The orientation of the inertial sensors with respect to the navigation coordinate frame can be calculated from the transformation matrix between the navigation coordinate frame and the inertial sensor reference frame. In one embodiment, the navigation coordinate frame for the mobile platform 100 may be simply the global reference frame, in which case, the orientation of the inertial sensors with respect to the navigation coordinate frame can be calculated from the transformation matrix between the global reference frame and the inertial sensor reference frame. FIG. 7, by way of example, illustrates a perspective view of the inertial sensors 170 and camera 120 in the mobile platform 100. As can be seen, the inertial sensors 170 may not have the same orientation as the camera 120. The orientation of the inertial sensors 170 with respect to the camera 120 may be estimated through calibration so that the transformation matrix between the camera reference frame 120*ref* and the inertial sensor reference frame 170*ref* is known. In other words, the transformation matrix for the inertial sensors 170 can be determined as follows:

$$C_{inertial\ sensors}^{nav\text{-}frame} = C_{inertial\ sensors}^{global\text{-}ref} = C_{camera}^{global\text{-}ref} C_{inertial\ sensors}^{camera} \quad \text{Eq. 2}$$

where $C_{inertial\ sensors}^{global\text{-}ref}$ is the transformation matrix between the inertial sensor reference frame 170*ref* and the global reference frame and $C_{inertial\ sensors}^{camera}$ is the transformation matrix between the inertial sensor reference frame 170*ref* and the camera reference frame 120*ref*, which is determined during calibration. The orientation of inertial sensors with respect to the navigation coordinate frame can be calculated from $C_{inertial\ sensors}^{nav\text{-}frame} = C_{inertial\ sensors}^{global\text{-}ref}$.

In another embodiment, the navigation coordinate frame for the mobile platform 100 may differ from the global reference frame. For example, the inertial navigation system may use a local-level coordinate frame or an earth fixed coordinate frame as the navigation coordinate frame. In this embodiment, the transformation matrix between the navigation coordinate frame and the inertial sensor reference frame (210) can be determined based on the transformation matrix between inertial sensor reference frame and the global reference frame discussed above and a transformation matrix between the global reference frame and the navigation coordinate frame that can be calculated from the determined position of the camera. The orientation of the inertial sensors with respect to the navigation coordinate frame can be calculated from the transformation matrix between the navigation coordinate frame and the inertial sensor reference frame. In other words, the transformation matrix for the inertial sensors 170 can be determined as follows:

$$C_{inertial\ sensors}^{nav\text{-}frame} = C_{global\text{-}ref}^{nav\text{-}frame} C_{inertial\ sensors}^{global\text{-}ref} \quad \text{Eq. 3}$$

where $C_{inertial\ sensors}^{nav\text{-}frame}$ is the transformation matrix between the inertial sensor reference frame 170*ref* and the navigation coordinate frame and $C_{global\text{-}ref}^{nav\text{-}frame}$ is the transformation matrix between the global reference frame and the navigation coordinate frame, which is calculated from the determined position of the camera. The orientation of inertial sensors with respect to the navigation coordinate frame can be calculated from $C_{inertial\ sensors}^{nav\text{-}frame}$.

The velocity, position, orientation and transformation matrix for the inertial navigation system is initialized (212). Because the mobile platform 100 is held stationary momentarily while imaging the object 202, the velocity can be initialized as zero. The position of the inertial navigation system is set to the position of the camera 120 with respect to the global reference frame as determined in step 208. The transformation matrix between the navigation coordinate frame and the inertial sensor reference frame determined from step 210 is set to $C_{inertial\ sensors}^{nav\text{-}frame}$. The initial orientation of inertial sensor with respect to the navigation coordinate frame can be calculated from the initialized transformation matrix between the inertial sensor reference frame and the navigation coordinate frame.

During navigation, the position and orientation of the mobile platform 100 is updated using measurements from the inertial sensors, along with the initialized position, the transformation matrix and the initialized velocity of the inertial navigation system (214). The updated positional and orientational information is provided by the mobile platform (216), e.g., via display 162 or speaker 168 shown in FIG. 3. The displayed positional and orientational information may include the position and orientation of the inertial navigation system as determined, e.g., through dead reckoning. It should be understood, however, that the orientation need not be displayed if desired.

Figure 8:
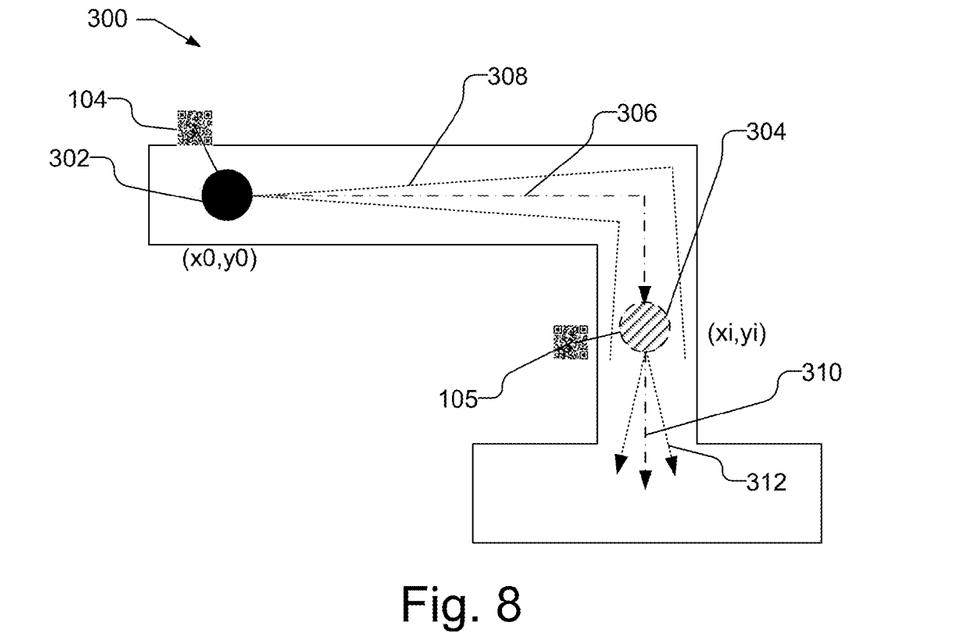
FIG. 8 illustrates a simple digital map with positional information of a mobile platform during inertial navigation.

Thus, after initializing the inertial navigation system 170 using the positional and orientational information determined using the image of the object 104, navigation using the inertial sensors 170 may begin. FIG. 8 illustrates a simple digital map 300 that may be displayed, e.g., on the visual display 162 of the mobile platform 100, and illustrates obtaining and using positional and orientational information during inertial navigation. The digital map 300 may be referenced to the global reference frame as discussed above, which may be a local coordinate system or a global coordinate system, such as WGS84. The digital map 300 may be accessed and downloaded using the data decoded from the image of the object 104. The initial position 302 (x0, y0 and velocity of the mobile platform 100 is determined as discussed above, using the image of the object 104 and is illustrated as being displayed on the digital map 300. It should be understood that FIG. 8 illustrates a relatively simple digital map 300 of a local indoor environment for illustrative purposes and that the digital map 300 may be as complex as desired or needed. For example, the digital map 300 may include multiple levels, rooms, etc. and may include textual and/or graphical information. Moreover, the digital map 300 is not limited to indoor environments. For example, the digital map 300 may be used for any outdoor environments, particularly where GPS navigation is not accessible due to blockage conditions or is simply not available on the mobile platform.

As the mobile platform 100 moves, measurements from the inertial sensors 170 is used along with the initialized position, velocity, and transformation matrix, to update the position of the mobile platform 100, which can be displayed on digital map 300. By way of example, an updated position 304 (xi,yi) of the mobile platform 100 is illustrated on digital map 300. However, because inertial sensors tend to amass errors over time, the uncertainty associated with the position of the mobile platform 100 increases as the mobile platform moves. For illustrative purposes, the path of the mobile platform 100 is illustrated with a dot-dash line 306, while the increasing associated uncertainty is illustrated with the dotted lines 308. It should be understood, however, that the path and/or position uncertainty may not be displayed by the mobile platform 100.

As illustrated in FIG. 8, a different object 105 may be used by the mobile platform 100 to correct errors in the inertial navigation system. The different object 105 may be similar to object 104, but is encoded with information related to the specific position and orientation of the object 105, such as a URI from which that information may be downloaded.

Figure 9:
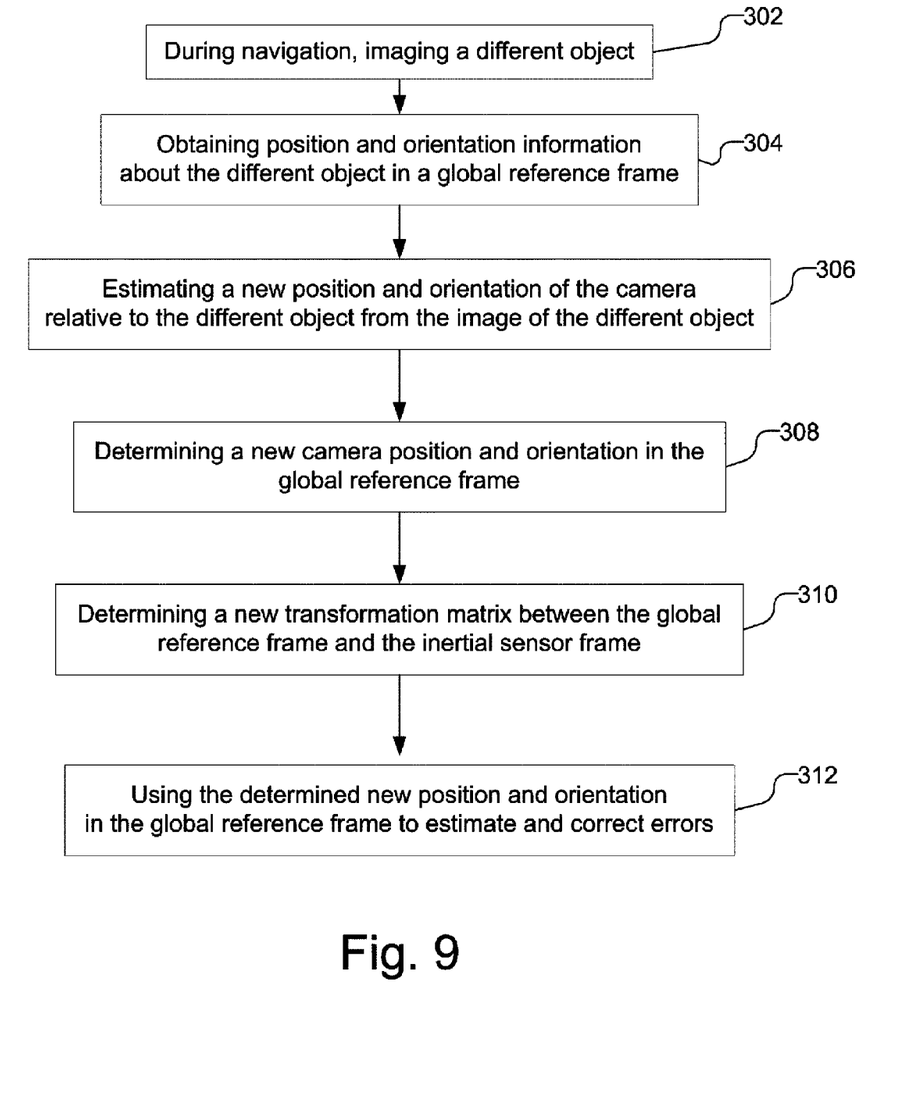
FIG. 9 is a flow chart showing a method of using an image of an object to correct INS errors during navigation.

FIG. 9 is a flow chart showing a method of using an image of a different object 105 to correct errors during navigation with the mobile platform 100. The process illustrated in FIG. 9 is similar to the process described in FIG. 4, except that the inertial navigation has already been initialized and during navigation a different object 105 is imaged (302). As described in FIG. 4, the positional and orientational information for the object relative to the global reference frame is obtained (304) and the position and orientation of the camera relative to the different object 105 is estimated using the image (306). The current camera position and orientation in the global reference frame can then be determined (308). The new position and orientation in the global reference frame can then be used to estimated and correct inertial position errors, velocity errors, orientation errors, and inertial sensor 170 errors, such as gyro and accelerometer drifts. As illustrated in FIG. 8, once the navigation errors are corrected, i.e., the position and orientation of the mobile platform 100 is determined, the accumulated uncertainty in the updated position 304 is reduced. Thus, inertial navigation with mobile platform 100 may continue, as illustrated by the path 310 of the mobile platform 100 with the new associated uncertainty 312.

Figure 10:
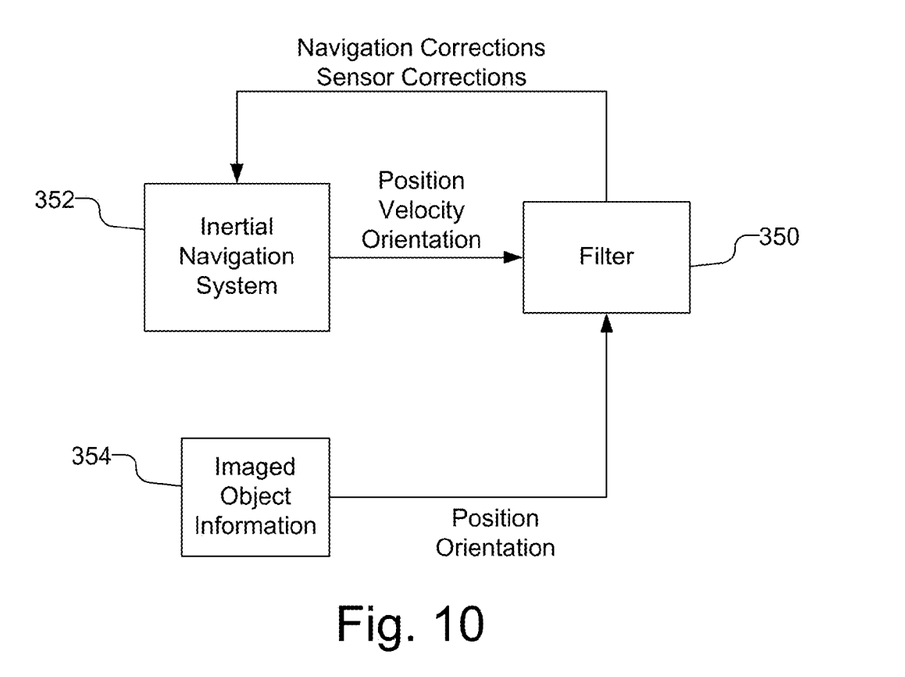
FIG. 10 schematically illustrates a system that corrects errors in inertial navigation using information from an imaged object.

FIG. 10 schematically illustrates using a different object to correct errors in inertial navigation system. FIG. 10 shows a filter 350, such as a discrete Kalman filter, that is coupled to the inertial navigation system 352, which includes the inertial sensors 170 as well as the position engine 146. The filter 350 is also illustrated as being coupled to receive imaged object information 354, such as the positional and orientational information from an imaged object 105, which is treated by the Kalman filter as a discrete-time position and orientation sensor with a variable sampling rate. The filter 350 receives, e.g., position, velocity and orientation information from the inertial navigation system and position and orientation information from an imaged object 105. The position and orientation information from the imaged object 105 is used to update the filter 350 to estimate inertial position errors, velocity errors, orientation errors, and inertial sensor 170 errors, such as gyro drifts, and accelerometer biases. The error estimates from the filter 350 are used to provide navigation correction and sensor corrections to the inertial navigation system 352.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   capturing an image of an object with a camera in a mobile platform while stationary, the mobile platform having an inertial navigation system including inertial sensors, wherein an orientation between the inertial sensors and the camera is known;
   obtaining position and orientation information of the object in a global reference frame;
   estimating a position and orientation of the camera relative to the object from the image of the object;
   determining a camera position and orientation in the global reference frame from the estimated position and orientation of the camera relative to the object and the obtained position and orientation of the object in the global reference frame;
   determining with a processor a transformation matrix between a navigation coordinate frame and an inertial sensor reference frame for the inertial navigation system using the determined camera position and orientation in the global reference frame and the orientation between the inertial sensors and the camera, wherein determining the transformation matrix between the navigation coordinate frame and the inertial sensor reference frame comprises using a determined first transformation matrix between a camera reference frame and an object reference frame and a second transformation matrix between the global reference frame and the object reference frame;
   setting a velocity of the inertial navigation system to zero;
   setting the position of the inertial navigation system to the estimated position of the camera in the global reference frame;
   using measurements from the inertial sensors, the determined transformation matrix, the set velocity and the set position of the inertial navigation system to update the inertial navigation system position, velocity, and orientation; and
   providing the updated estimate of the position of the inertial navigation system as a position of the mobile platform.

2. The method of claim 1, further comprising:
   capturing an image of a different object with the camera in the mobile platform while stationary;
   obtaining position and orientation information of the different object in the global reference frame;
   estimating a new position and orientation of the camera relative to the different object from the image of the different object;
   determining a new camera position and orientation in the global reference frame from the estimated new position and orientation of the camera relative to the object and the obtained position and orientation of the different object in the global reference frame; and
   using at least one of the determined new camera position and/or orientation in the global reference frame to estimate and correct errors in the position, velocity and orientation of the inertial navigation system, and the inertial sensors.

3. The method of claim 2, wherein the errors in the position, velocity, and orientation of the inertial navigation system, and the inertial sensors are estimated and corrected using a Kalman filter.

4. The method of claim 1, wherein determining the transformation matrix between the navigation coordinate frame and the inertial sensor reference frame further comprises using a third transformation matrix between the camera reference frame and the inertial sensor reference frame.

5. The method of claim 4, wherein determining the transformation matrix between the navigation coordinate frame and the inertial sensor reference frame further comprises using a fourth transformation matrix between the global reference frame and the navigation coordinate frame.

6. The method of claim 1, wherein the object is a data code label.

7. The method of claim 1, wherein the object is a Quick Response code.

8. The method of claim 1, wherein the object is encoded with a Uniform Resource Identifier (URI) and wherein obtaining position and orientation information about the object comprises:
   decoding the object to determine the URI; and
   accessing and downloading the position and orientation information about the object using the URI.

9. The method of claim 1, wherein providing the updated estimate of the position of the inertial navigation system as a position of the mobile platform comprises displaying the updated estimate of the position on a digital map on the mobile platform.

10. A mobile platform comprising:
   a camera being operable to image an object;
   an inertial navigation system comprising inertial sensors that provides motion and rotation data;
   a processor connected to the camera and the inertial sensors;
   memory connected to the processor; and
   software held in the memory and run in the processor to cause the processor to obtain position and orientation information about the object in a global reference frame, estimate a position and orientation of the camera relative to the object from an image of the object taken by the camera; determine a camera position and orientation in the global reference frame from the estimated position and orientation and the obtained position and orientation of the object in the global reference frame; determine a transformation matrix between a navigation coordinate frame and an inertial sensor reference frame for the inertial navigation system using the determined camera position and orientation in the global reference frame and a known orientation between the inertial sensors and the camera, wherein the software causes the processor to determine a first transformation matrix between a camera reference frame and an object reference frame and a second transformation matrix between the global reference frame and the object reference frame to determine the transformation matrix between the navigation coordinate frame and the inertial sensor reference frame; initializing the inertial navigation system with a velocity of zero, the determined position of the camera in the global reference frame and the determined transformation matrix between the navigation coordinate frame and the inertial sensor reference frame; using data from the inertial sensors and the initialized velocity, position and transformation matrix to update the inertial navigation system position; providing the updated inertial navigation system position as a position of the mobile platform; and
   wherein the software causes the processor to determine a first transformation matrix between a camera reference frame and an object reference frame and a second transformation matrix between the global reference frame and the object reference frame to determine the transformation matrix between the navigation coordinate frame and the inertial sensor reference frame.

11. The mobile platform of claim 10, wherein the software causes the processor to further cause the processor to obtain position and orientation information about a different imaged object in the global reference frame, estimate a new position and orientation of the camera relative to the different imaged object from an image taken by the camera; determine a new camera position and orientation in the global reference frame from the estimated new position and orientation and the obtained position and orientation of the different imaged object in the global reference frame; and use at least one of the determined new camera position and orientation in the global reference frame to estimate and correct errors in the position, velocity, and orientation of the inertial navigation system and the inertial sensors.

12. The mobile platform of claim 10, further comprising a Kalman filter, wherein the Kalman filter uses the at least one of the determined new camera position and orientation in the global reference frame to estimate and correct errors in the position, velocity and orientation of the inertial navigation system and the inertial sensors.

13. The mobile platform of claim 10, wherein the software further causes the processor to use a third transformation matrix between the camera reference frame and the inertial sensor reference frame to determine the transformation matrix between the navigation coordinate frame and the inertial sensor reference frame.

14. The mobile platform of claim 13, wherein the software further causes the processor to use a fourth transformation matrix between the global reference frame and the navigation coordinate frame to determine the transformation matrix between the navigation coordinate frame and the inertial sensor reference frame.

15. The mobile platform of claim 10, further comprising a display, wherein the software held in the memory and run in the processor controls the processor to display the position on the mobile platform.

16. The mobile platform of claim 10, further comprising an object decoder to decode the object, the object decoder being coupled to the processor, wherein processor obtains position and orientation information about the object in a global reference frame using a Uniform Resource Identifier (URI) that is encoded in the object.

17. A system for accessing and updating positional information for a mobile platform comprising:
   a means for imaging an object;
   means for obtaining position and orientation information about the object in a global reference frame;
   means for estimating a position and orientation of the means for imaging relative to the object from the image of the object;
   means for determining a position and orientation of the means for imaging in the global reference frame from the estimated position and orientation and the obtained position and orientation of the object;
   means for sensing movement of the mobile platform;
   means for determining a transformation matrix between a navigation coordinate frame and a frame for the means for sensing movement using the determined position and orientation of the means for imaging and a known orientation between the frame for the means for sensing movement and the means for imaging, wherein the means for determining the transformation matrix uses a first transformation matrix between a frame for the means for imaging and an object reference frame and a second transformation matrix between the global reference frame and the object reference frame;
   means for initializing an inertial navigation system with a velocity of zero, the determined position of the means for imaging and the determined transformation matrix between the navigation coordinate frame and the frame for the means for sensing movement;
   means for determining a position, velocity, and orientation of the mobile platform using the data from the means for sensing movement, and the initialized velocity, position, and transformation matrix; and
   means for providing the determined position of the mobile platform.

18. The system of claim 17, wherein the means for imaging images a different object; the means for obtaining position and orientation information obtains position and orientation information about the different object in the global reference frame; the means for estimating a position and orientation of the means for imaging estimates a new position and orientation of the means for imaging; the means for determining a position and orientation of the means for imaging in the global reference frame determines a new position and orientation of the means for imaging in the global reference frame from the estimated new position and orientation and the obtained position and orientation of the different object, the system further comprising:
   means for correcting errors in the position, velocity and orientation of the mobile platform using at least one of the determined new position and orientation of the means for imaging.

19. The system of claim 17, wherein the means for determining the transformation matrix further uses a third transformation matrix between the frame for the means for imaging and the frame for the means for sensing movement.

20. The system of claim 19, wherein the means for determining the transformation matrix further uses a fourth transformation matrix between the navigation coordinate frame and the global reference frame.

21. The system of claim 17, wherein means for providing the determined position of the mobile platform comprises a means for displaying the determined position on a digital map.

22. The system of claim 17, wherein the object is a data code label and the system further comprising a data code label reader.

23. The system of claim 17, wherein the means for obtaining position and orientation information about the object in a global reference frame is a web browser in the mobile platform.

24. A non-transitory computer-readable medium including program code stored thereon, comprising:
   program code to decode and obtain position and orientation information in a global reference frame about an object that is imaged;
   program code to estimate a position and orientation from an image of the object;
   program code to determine a position and orientation in the global reference frame from the estimated position and orientation and the obtained position and orientation information in the global reference frame about the imaged object;
   program code to determine a transformation matrix between a navigation coordinate frame and a frame for inertial sensors of an inertial navigation system using the determined position and orientation in the global reference frame and a known orientation between the frame for the inertial sensors and a frame for a camera that produced the image of the object, wherein the program code to determine the transformation matrix uses a first transformation matrix between a frame for the means for imaging and an object reference frame and a second transformation matrix between the global reference frame and the object reference frame;
   program code to initialize the inertial navigation system using the determined position and orientation, the determined transformation matrix and a velocity of zero;
   program code to determine an updated position using the initialized position, transformation matrix, velocity and data from the inertial sensors; and
   program code to provide the updated position.

25. The non-transitory computer-readable medium including program code stored thereon of claim 24, further comprising:
   program code to correct errors in position, velocity and orientation of the inertial navigation system and the inertial sensors using at least one of the determined position and a new orientation determined from an image of a different object.

* * * * *